United States Patent
Gonser et al.

(10) Patent No.: US 10,033,533 B2
(45) Date of Patent: Jul. 24, 2018

(54) MOBILE SOLUTION FOR SIGNING AND RETAINING THIRD-PARTY DOCUMENTS

(71) Applicant: DocuSign, Inc., San Francisco, CA (US)

(72) Inventors: Thomas H. Gonser, Bellevue, WA (US); Donald G. Peterson, Kirkland, WA (US)

(73) Assignee: DocuSign, Inc., San Francisco, CA (US)

( * ) Notice: Subject to any disclaimer, the term of this patent is extended or adjusted under 35 U.S.C. 154(b) by 25 days.

(21) Appl. No.: 14/310,805

(22) Filed: Jun. 20, 2014

(65) Prior Publication Data

US 2014/0304518 A1    Oct. 9, 2014

Related U.S. Application Data (63) Continuation of application No. 13/595,876, filed on Aug. 27, 2012, now Pat. No. 8,838,980.

(Continued)

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/32* (2013.01); *G06F 21/645* (2013.01); *G06Q 10/10* (2013.01); *H04L 63/126* (2013.01)

(58) Field of Classification Search
CPC .................................................... H04L 9/3247
(Continued)

(56) References Cited

U.S. PATENT DOCUMENTS

| 5,040,142 A | 8/1991 | Mori et al. |
| 5,220,675 A | 6/1993 | Padawer et al. |

(Continued)

FOREIGN PATENT DOCUMENTS

| CN | 101326517 A | 12/2007 |
| CN | 101299256 | 11/2008 |

(Continued)

OTHER PUBLICATIONS

"U.S. Appl. No. 13/595,876, Non Final Office Action dated Jul. 3, 2013", 20 pgs.

(Continued)

*Primary Examiner* — Harris C Wang
(74) *Attorney, Agent, or Firm* — Schwegman, Lundberg & Woessner, P.A.

(57) ABSTRACT

Techniques for signer-initiated electronic document signing via an electronic signature service using a mobile or other client device are described. Example embodiments provide an electronic signature service ("ESS") configured to facilitate the creation, storage, and management of documents and corresponding electronic signatures. In some embodiments, when a signer user receives an electronic signature document on a mobile device, the signer may use a client module executing on the mobile device to import the document into the ESS. Once the document is imported into the ESS, the signer can access, review, and sign the document at the ESS via the mobile device. After signing the document, the signer can use the mobile device to cause the ESS to provide the signed document to one or more recipients.

13 Claims, 7 Drawing Sheets

Related U.S. Application Data (60) Provisional application No. 61/527,406, filed on Aug. 25, 2011.

(51) Int. Cl.
    *G06Q 10/10* (2012.01)
    *G06F 21/64* (2013.01)
    *G06F 21/32* (2013.01)

(58) Field of Classification Search
    USPC ........................................................ 713/176
    See application file for complete search history.

(56) References Cited

U.S. PATENT DOCUMENTS

| | | |
|---|---|---|
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |
| 5,553,145 A | 9/1996 | Micali |
| 5,615,268 A | 3/1997 | Bisbee et al. |
| 5,629,982 A | 5/1997 | Micali |
| 5,689,567 A | 11/1997 | Miyauchi |
| 5,748,738 A | 5/1998 | Bisbee et al. |
| 5,813,009 A | 9/1998 | Johnson et al. |
| 5,832,499 A | 11/1998 | Gustman |
| 5,872,848 A | 2/1999 | Romney et al. |
| 5,898,156 A | 4/1999 | Wilfong |
| 6,021,202 A | 2/2000 | Anderson et al. |
| 6,067,531 A | 5/2000 | Hoyt et al. |
| 6,085,322 A | 7/2000 | Romney et al. |
| 6,092,080 A | 7/2000 | Gustman |
| 6,119,229 A | 9/2000 | Martinez et al. |
| 6,128,740 A | 10/2000 | Curry et al. |
| 6,161,139 A | 12/2000 | Win et al. |
| 6,185,587 B1 | 2/2001 | Bernardo et al. |
| 6,185,683 B1 | 2/2001 | Ginter et al. |
| 6,199,052 B1 | 3/2001 | Mitty et al. |
| 6,210,276 B1 | 4/2001 | Mullins |
| 6,237,096 B1 | 5/2001 | Bisbee et al. |
| 6,289,460 B1 | 9/2001 | Hajmiragha |
| 6,321,333 B1 | 11/2001 | Murray |
| 6,327,656 B2 | 12/2001 | Zabetian |
| 6,367,010 B1 | 4/2002 | Venkatram et al. |
| 6,367,013 B1 | 4/2002 | Bisbee et al. |
| 6,446,115 B2 | 9/2002 | Powers |
| 6,470,448 B1 | 10/2002 | Kuroda et al. |
| 6,584,466 B1 | 6/2003 | Serbinis et al. |
| 6,615,348 B1 | 9/2003 | Gibbs |
| 6,658,403 B1 | 12/2003 | Kuroda et al. |
| 6,671,805 B1 | 12/2003 | Brown et al. |
| 6,726,094 B1 | 4/2004 | Rantze et al. |
| 6,728,762 B1 | 4/2004 | Estrada et al. |
| 6,751,632 B1 | 6/2004 | Petrogiannis |
| 6,754,829 B1 | 6/2004 | Butt et al. |
| 6,796,489 B2 | 9/2004 | Slater et al. |
| 6,807,633 B1 | 10/2004 | Pavlik |
| 6,829,635 B1 | 12/2004 | Townshend |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,959,382 B1 | 10/2005 | Kinnis et al. |
| 6,961,854 B2 | 11/2005 | Serret-Avila et al. |
| 6,973,569 B1 | 12/2005 | Anderson et al. |
| 6,990,684 B2 | 1/2006 | Futamura et al. |
| 7,039,805 B1 | 5/2006 | Messing |
| 7,059,516 B2 | 6/2006 | Matsuyama et al. |
| 7,069,443 B2 | 6/2006 | Berringer et al. |
| 7,093,130 B1 | 8/2006 | Kobayashi et al. |
| 7,100,045 B2 * | 8/2006 | Yamada ................. H04L 9/321 |
| | | 713/156 |
| 7,103,778 B2 | 9/2006 | Kon et al. |
| 7,140,541 B2 | 11/2006 | Stelzer |
| 7,162,635 B2 | 1/2007 | Bisbee et al. |
| 7,167,844 B1 | 1/2007 | Leong et al. |
| 7,197,644 B2 | 5/2007 | Brewington |
| 7,237,114 B1 | 6/2007 | Rosenberg |
| 7,340,608 B2 | 3/2008 | Laurie et al. |
| 7,343,551 B1 | 3/2008 | Bourdev |
| 7,360,079 B2 | 4/2008 | Wall |
| 7,395,436 B1 | 7/2008 | Nemovicher |
| 7,395,503 B1 | 7/2008 | Pravetz |
| 7,424,543 B2 | 9/2008 | Rice, III |
| 7,437,421 B2 | 10/2008 | Bhogal et al. |
| 7,523,315 B2 | 4/2009 | Hougaard et al. |
| 7,533,268 B1 | 5/2009 | Catoricini et al. |
| 7,554,576 B2 | 6/2009 | Erol et al. |
| 7,562,053 B2 | 7/2009 | Twining et al. |
| 7,568,101 B1 | 7/2009 | Catoricini et al. |
| 7,568,104 B2 | 7/2009 | Berryman et al. |
| 7,581,105 B2 | 8/2009 | Dietl |
| 7,581,106 B2 | 8/2009 | Das et al. |
| 7,657,832 B1 | 2/2010 | Lin |
| 7,660,863 B2 | 2/2010 | Boursetty et al. |
| 7,788,259 B2 | 8/2010 | Patterson et al. |
| 7,934,098 B1 | 4/2011 | Hahn et al. |
| 7,953,977 B2 | 5/2011 | Maruyama et al. |
| 8,103,867 B2 | 1/2012 | Spitz |
| 8,132,013 B2 | 3/2012 | Meier |
| 8,286,071 B1 | 10/2012 | Zimmerman et al. |
| 8,588,483 B2 * | 11/2013 | Hicks .................... G06F 9/4443 |
| | | 382/119 |
| 8,612,349 B1 | 12/2013 | Ledder et al. |
| 8,838,980 B2 | 9/2014 | Gonser et al. |
| 2001/0018739 A1 | 8/2001 | Anderson et al. |
| 2001/0034739 A1 * | 10/2001 | Anecki .................. G06Q 10/10 |
| | | 715/205 |
| 2001/0034835 A1 | 10/2001 | Smith |
| 2002/0004800 A1 * | 1/2002 | Kikuta ................. H04L 9/3231 |
| | | 715/255 |
| 2002/0019937 A1 | 2/2002 | Edstrom et al. |
| 2002/0026427 A1 | 2/2002 | Kon et al. |
| 2002/0026582 A1 | 2/2002 | Futamura et al. |
| 2002/0040431 A1 * | 4/2002 | Kato .................... G06F 21/6209 |
| | | 713/168 |
| 2002/0069179 A1 * | 6/2002 | Slater .................... G06Q 20/00 |
| | | 705/67 |
| 2002/0069358 A1 | 6/2002 | Silvester |
| 2002/0078159 A1 * | 6/2002 | Petrogiannis ........... G06F 21/64 |
| | | 709/206 |
| 2002/0128969 A1 | 9/2002 | Parmelee et al. |
| 2002/0129056 A1 | 9/2002 | Conant et al. |
| 2002/0138445 A1 | 9/2002 | Laage et al. |
| 2002/0143711 A1 * | 10/2002 | Nassiri ................ G06Q 20/3821 |
| | | 705/76 |
| 2002/0162000 A1 | 10/2002 | Bensler |
| 2002/0178187 A1 | 10/2002 | Rasmussen et al. |
| 2002/0184485 A1 | 12/2002 | Dray et al. |
| 2002/0194219 A1 | 12/2002 | Bradley et al. |
| 2002/0196478 A1 | 12/2002 | Struble |
| 2003/0048301 A1 | 3/2003 | Menninger |
| 2003/0051016 A1 | 3/2003 | Miyoshi et al. |
| 2003/0078880 A1 | 4/2003 | Alley et al. |
| 2003/0120553 A1 | 6/2003 | Williams |
| 2003/0120930 A1 | 6/2003 | Simpson et al. |
| 2003/0131073 A1 | 7/2003 | Lucovsky et al. |
| 2003/0140252 A1 | 7/2003 | Lafon et al. |
| 2003/0217275 A1 | 11/2003 | Bentley et al. |
| 2004/0054606 A1 | 3/2004 | Broerman |
| 2004/0078337 A1 | 4/2004 | King et al. |
| 2004/0107352 A1 | 6/2004 | Yui et al. |
| 2004/0117627 A1 | 6/2004 | Brewington |
| 2004/0133493 A1 | 7/2004 | Ford et al. |
| 2004/0181756 A1 | 9/2004 | Berringer et al. |
| 2004/0225884 A1 * | 11/2004 | Lorenzini ............. G06F 21/645 |
| | | 713/176 |
| 2004/0230891 A1 | 11/2004 | Pravetz et al. |
| 2004/0250070 A1 | 12/2004 | Wong |
| 2004/0255114 A1 | 12/2004 | Lee et al. |
| 2004/0255127 A1 | 12/2004 | Arnouse |

(56) References Cited

U.S. PATENT DOCUMENTS

| | | |
|---|---|---|
| 2005/0033811 A1 | 2/2005 | Bhogal et al. |
| 2005/0049903 A1 | 3/2005 | Raja |
| 2005/0076215 A1 | 4/2005 | Dryer |
| 2005/0091143 A1 | 4/2005 | Schmidt et al. |
| 2005/0120217 A1 | 6/2005 | Fifield et al. |
| 2005/0165626 A1 | 7/2005 | Karpf |
| 2005/0182684 A1 | 8/2005 | Dawson et al. |
| 2005/0182956 A1 | 8/2005 | Ginter et al. |
| 2005/0192908 A1 | 9/2005 | Jorimann et al. |
| 2005/0231738 A1 | 10/2005 | Huff et al. |
| 2006/0041605 A1 | 2/2006 | King et al. |
| 2006/0041632 A1 | 2/2006 | Shah et al. |
| 2006/0047600 A1 | 3/2006 | Bodenheim et al. |
| 2006/0161780 A1 | 7/2006 | Berryman et al. |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0026927 A1 | 2/2007 | Yaldoo et al. |
| 2007/0079139 A1 | 4/2007 | Kim |
| 2007/0088958 A1 | 4/2007 | Qa'lm-maqami |
| 2007/0118732 A1 | 5/2007 | Whitmore |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 | 8/2007 | Foygel et al. |
| 2007/0208944 A1 | 9/2007 | Pavlicic |
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0097777 A1 | 4/2008 | Rielo |
| 2008/0141033 A1 | 6/2008 | Ginter et al. |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |
| 2008/0260287 A1 | 10/2008 | Berryman et al. |
| 2008/0313723 A1 | 12/2008 | Naono et al. |
| 2009/0024912 A1* | 1/2009 | McCabe .............. G06Q 10/10 715/224 |
| 2009/0025087 A1 | 1/2009 | Peirson, Jr. et al. |
| 2009/0044019 A1 | 2/2009 | Lee et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0185679 A1* | 7/2009 | Haider .............. G06F 21/645 380/30 |
| 2009/0268903 A1 | 10/2009 | Bojinov et al. |
| 2009/0292786 A1 | 11/2009 | McCabe et al. |
| 2009/0327144 A1 | 12/2009 | Hatter et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0161993 A1* | 6/2010 | Mayer .............. G06F 21/64 713/178 |
| 2010/0217987 A1 | 8/2010 | Shevade |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0093807 A1 | 4/2011 | Dunn et al. |
| 2011/0119165 A1 | 5/2011 | Zee |
| 2011/0126022 A1 | 5/2011 | Sieberer |
| 2011/0238510 A1 | 9/2011 | Rowen et al. |
| 2011/0264907 A1 | 10/2011 | Betz et al. |
| 2011/0276875 A1* | 11/2011 | McCabe .............. G06Q 10/10 715/255 |
| 2011/0314371 A1* | 12/2011 | Peterson .............. G06F 21/645 715/234 |
| 2012/0180135 A1 | 7/2012 | Hodges et al. |
| 2012/0190405 A1 | 7/2012 | Kumaran |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1* | 6/2013 | Gonser .............. G06Q 10/10 713/176 |
| 2013/0179676 A1 | 6/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |

FOREIGN PATENT DOCUMENTS

| | | |
|---|---|---|
| CN | 101364869 A | 2/2009 |
| CN | 104011710 A | 8/2014 |
| CN | 104025078 A | 9/2014 |
| CN | 104025078 B | 3/2017 |
| EP | 1238321 | 6/2001 |
| EP | 2748721 A1 | 7/2014 |
| GB | 2391669 A | 2/2004 |
| JP | 2000048072 | 2/2000 |
| JP | 2003271529 | 9/2003 |
| JP | 2003296192 A | 10/2003 |
| JP | 2003323574 A | 11/2003 |
| JP | 2005148917 A | 6/2005 |
| JP | 2005267438 | 9/2005 |
| JP | 2005311545 A | 11/2005 |
| JP | 2006033727 A | 2/2006 |
| JP | 2007006122 A | 1/2007 |
| JP | 2008117258 | 5/2008 |
| JP | 2008225527 | 9/2008 |
| JP | 2011024155 A | 2/2011 |
| JP | 2014528198 A | 10/2014 |
| JP | 2014535216 A | 12/2014 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| SG | 11201401760V | 4/2016 |
| WO | 1996007156 | 3/1996 |
| WO | 2003091834 | 11/2003 |
| WO | 2007075235 | 7/2007 |
| WO | 2008124627 | 10/2008 |
| WO | 2009012478 | 1/2009 |
| WO | WO-2009012478 A3 | 1/2009 |
| WO | 2010105262 | 9/2010 |
| WO | WO-2010105262 | 9/2010 |
| WO | WO-2013029048 | 2/2013 |
| WO | WO-2013063494 | 5/2013 |

OTHER PUBLICATIONS

"U.S. Appl. No. 13/595,876, Notice of Allowance dated Mar. 7, 2014", 17 pgs.

"U.S. Appl. No. 13/595,876, Response filed Sep. 30, 2013 to Non Final Office Action dated Jul. 3, 2013", 13 pgs.

"European Application Serial No. 12826301.9, Extended European Search Report dated Feb. 10, 2015", 5 pgs.

"European Application Serial No. 12826301.9, Office Action dated Feb. 27, 2015", 1 pg.

"European Application Serial No. 12826301.9, Office Action dated Apr. 1, 2014", 3 pgs.

"European Application Serial No. 12826301.9, Response filed Oct. 2, 2014", 1 pg.

(56) References Cited

OTHER PUBLICATIONS

"International Application Serial No. PCT/US2012/052554, International Preliminary Report on Patentability dated Mar. 6, 2014", 4 pgs.
"International Application Serial No. PCT/US2012/052554, International Search Report dated Jan. 23, 2013", 3 pgs.
"International Application Serial No. PCT/US2012/052554, Written Opinion dated Jan. 23, 2013", 3 pgs.
"Singapore Application Serial No. 11201400184Y, Examination Report dated Jun. 29, 2015", 13 pgs.
"Singapore Application Serial No. 11201400184Y, Response filed Jun. 15, 2015 to Written Opinion dated Dec. 18, 2014", 5 pgs.
"Singapore Application Serial No. 11201400184Y, Search Report dated Dec. 18, 2014", 8 pgs.
"Singapore Application Serial No. 11201400184Y, Written Opinion dated Dec. 18, 2014", 12 pgs.
Barnasak, O, et al., "A Secure Proxy Signature Protocol for Agent-Based M-Conunerce Applications", Published in: Computers and Conununications, Proceedings. ISCC 2004 Ninth International Symposium on (vol. 1 ), (2004), 399-406.
Nentwich, et al., "Practical Security Aspects of Digital Signature Systems", Technical University Vienna. Technical (2006), (2006), 1-11.
Wheeler et al., "DocuSign Unveils new Scalable Product and Support Offerings of Electronic Signature and Electronic Contract Execution," DocuSign The Fastest Way to Get a Signature, 2 pp., Jan. 2008.
Borozdin et al., "DocuSign Connect Service Guide," DocuSign, Inc., pp. 1-9, 2008.
ELynx Adds Workflow Management to Electronic Document Platform—new Workflow Capabilities Provide for Electronic Enhanced Loan Processing, eLynx, http://www.elynx.com/news/view/82, 2 pp. Jan. 2009. .
Laurens Leurs; The history of PDF; Feb. 14, 2010; Prepressure. com; pp. 1-12.
Brown, "Digital Signatures: Can They Be Accepted As Legal Signatures in EID?", Dec. 1993, ACM, p. 86-92.
Herzberg et al., "SurfN'Sign: Client Signatures on Web Documents", 1998, IEEE, vol. 37 Issue 1, p. 61-71.
Kwok et al., "An Automatic Electronic Contract Document Signing System in a Secure Environment", 2005, IEEE, p. 497-502.
Su et al., "Signature-In-Signature Verification Via a Secure Simple Network Protocol", 2010, IEEE, p. 1-4.
Zefferer et al., "An Electronic-Signature Based Circular Resolution Database System," Mar 2010, ACM, p. 1840-1845.
Kamara et al., "Cryptographic Cloud Storage", 2010, Financial Cryptography and Data Security, p. 136-149.
Harold, Elliotte Rusty, XML Bible. IDG Books Worldwide, Inc., 1999, p. 191-192.
"Australian Application serial No. 2012298605, Non Final Office Action dated Aug. 31, 2016", 3 pgs.
"Chinese Application Serial No. 201280052552.6, Office Action dated Dec. 3, 2015", W/ English Translation, 21 pgs.
"Chinese Appication Serial No. 201280052552.6, Response filed Feb. 15, 2016 to Office Action dated Dec. 3, 2015", W/ English Caims, 8 pgs.
"Chinese Name Application Serial No. 201280052552.6, Office Action dated May 23, 2016" W/ English Translation, 12 pgs
"Chinese Name Application Serial No. 201280052552.6, Response filed Aug. 8, 2016 to Office Action dated May 23, 2016", W/ English Claims, 8 pgs.
"Japanese Application Serial No. 2014-527354, Office Action dated Jun. 29, 2016", W/ English Translation, 4 pgs.
"Japanese Appication Serial No. 2014-527354, Response filed Sep. 29, 2016 to Office Action dated Jun. 29, 2016", W/ English Claims, 8 pgs.
"U.S. Appl. No. 13/662,173, Examiner Interview Summary dated Oct. 20, 2015", 3 pgs.
"U.S. Appl. No. 13/662,173, Final Office Action dated Feb. 2, 2016", 12 pgs.
"U.S. Appl. No. 13/662,173, Non Final Office Action dated Jul. 16, 2015", 16 pgs.
"U.S. Appl. No. 13/662,173, Non Final Office Action dated Sep. 30, 2016", 14 pgs.
"U.S. Appl. No. 13/662,173, Response filed May 2, 2016 to Final Office Action dated Feb. 2, 2016", 10 pgs.
"U.S. Appl. No. 13/662,173, Response filed Nov. 3, 2015 to Non Final Office Action dated Jul. 16, 2015", 9 pgs.
"U.S. Appl. No. 13/662,173, Response filed Dec. 19, 2016 to Non Final Office Action dated Sep. 30, 2016", 12 pgs.
"Australian Application serial No. 2012298605, Response filed Dec. 8, 2016 to Non Final Office Action dated Aug. 31, 2016", 21 pgs.
"Chinese Application Serial No. 201280064786.2, Office Action dated Jan. 21, 2016", W/ English Translation, 22 pgs.
"Chinese Application Serial No. 201280064786.2, Response filed Aug. 4, 2016 to Office Action dated Jan. 21, 2016", W/ English Claims, 12 pgs.
"European Application Serial No. 12826301.9, Response filed Sep. 7, 2015 to Extended European Search Report dated Feb. 10, 2015", 15 pgs.
"European Application Serial No. 12843451.1, Extended European Search Report dated Apr. 9, 2015", 6 pgs.
"European Application Serial No. 12843451.1, Response filed Nov. 4, 2015 to Extended European Search Report dated Apr. 9, 2015", 41 pgs.
"International Application Serial No. PCT/US2012/062258, International Preliminary Report on Patentability dated May 8, 2014", 5 pgs.
"International Application Serial No. PCT/US2012/062258, International Search Report dated Mar. 28, 2013", 4 pgs.
"International Application Serial No. PCT/US2012/062258, Written Opinion dated Mar. 28, 2013", 4 pgs.
"Japanese Application Serial No. 2014-527354, Examiners Decision of Final Refusal dated Dec. 13, 2016", W/ English Translation, 3 pgs.
"Japanese Application Serial No. 2014-539081, Office Action dated Oct. 4, 2016", W/ English Translation, 5 pgs.
"Singapore Application Serial No. 11201401760V, International Search Report and Written Opinion dated Jul. 20, 2015", 10 pgs.
"Singapore Application Serial No. 11201401760V, Response filed Nov. 20, 2015 to International Search Report and Written Opinion dated Jul. 20, 2015", 6 pgs.
"U.S. Appl. No. 13/662,173, Final Office Action dated Apr. 17, 2017", 14 pgs.
"Australian Application serial No. 2012298605, Subsequent Examiners Report dated Jan. 17, 2017", 5 pgs.
"Australian Application Serial No. 2012328509, First Examiner Report dated Mar. 30, 2017", 4 pgs.
"Chinese Application Serial No. 201280064786.2, Office Action dated Dec. 12, 2016", 3 pgs.
"Chinese Application Serial No. 201280064786.2, Response filed Feb. 27, 2017 to Office Action dated Dec. 12, 2016", (English Translation of Claims), 9 pgs.
"Japanese Application Serial No. 2014-539081, Response filed Dec. 28, 2016 to Office Action mailed Oct. 4, 2016", 10 pgs.
"U.S. Appl. No. 13/662,173, Pre Appeal Bried Request filed Jul. 14, 2017", 5 pgs.
"Australian Application Serial No. 2012328509, Response filed Aug. 28, 2017 to Subsequent Examiners Report dated Jul. 14, 2017", 19 pgs.
"Australian Application Serial No. 2012328509, Response to First Examiner Report dated Jun. 20, 2017", 19 pgs.
"Australian Application Serial No. 2012328509, Subsequent Examiners Report dated Jul. 14, 2017", 5 pgs.
"European Application Serial No. 12826301.9, Communication Pursuant to Article 94(3) EPC dated Nov. 3, 2017", 4 pgs.
"European Application Serial No. 12843451.1, Response filed Aug. 30, 2017 to Communication Pursuant to Article 94(3) EPC dated Apr. 19, 2017", 6 pgs.
"Japanese Application Serial No. 2014-539081, Office Action dated Jul. 4, 2017", With English Translation, 6 pgs.

(56) References Cited

OTHER PUBLICATIONS

"Japanese Application Serial No. 2014-539081, Response filed Oct. 4, 2017 to Office Action dated Jul. 4, 2017", 16 pgs.
"U.S. Appl. No. 13/662,173, Pre-Appeal Brief Request filed Jul. 14, 2017", 5 pgs.
"Japanese Application Serial No. 2014-539081, Examiners Decision of Final Refusal dated Mar. 27, 2018", w/ English translation, 11 pgs.

\* cited by examiner

Browser

DocuSign: Select a tag from the add menu. Click Finish when you are ready.

+ Add   Finish   More Options  ←221

220

222

Signature
Initial
My Name
Company
Title
Date Signed
Text
Checkbox

Page 1    Page 2

Non-Disclosure Agreement ←223

This Agreement is entered into on this ____ day of ____ by and between ____ and ____ (the Disclosing Party), located at ____ with ____ (the Recipient), located at ____.

The Recipient hereto desires to participate in discussions regarding ____

MOBILE SOLUTION FOR SIGNING AND RETAINING THIRD-PARTY DOCUMENTS

PRIORITY CLAIM

This application is a continuation of U.S. application Ser. No. 13/595,876 filed Aug. 27, 2012 which claims the benefit of U.S. Provisional Application Ser. No. 61/527,406 filed Aug. 25, 2011, the contents of which are incorporated by reference.

FIELD OF THE INVENTION

The present disclosure relates to methods and systems for electronic signatures and, more particularly, to methods and systems to facilitate signer-initiated electronic document signing via an electronic signature service using a mobile or other client device.

BACKGROUND

One existing approach to electronic signatures provides an electronic signature "stamping" application for a mobile device. The signature application allows a user to open a document sent to them for signing and "stamp" a signature or other data into the document and return this by email. This approach suffers from a number of drawbacks. As one example, it only works with specific software applications for mobile devices, and the signing process is performed entirely in software on the mobile device. As such, the document must be manually moved from the email message into the device, manipulated, and then returned back to the device for email delivery. Also, to produce such an application for multiple devices or platforms requires that a largely redundant application be built for every platform, and then only for those platforms that have enough capability to actually manipulate PDFs. Not all platforms or devices can actually handle tasks like conversion of files, presentation of files, managing signature capture and placement and security. The inability of mobile devices to universally perform all such required functions severely limits the expansion of electronic signature services, particularly in the mobile device context.

BRIEF DESCRIPTION OF THE DRAWINGS

Preferred and alternative examples of the present invention are described in detail below with reference to the following drawings.

DETAILED DESCRIPTION

Embodiments described herein provide enhanced computer- and network-based methods and systems for mobile and other client devices to facilitate electronic document signing. Example embodiments provide an electronic signature service ("ESS") configured to facilitate the creation, storage, and management of documents and corresponding electronic signatures. Using the techniques described herein, a first user (a "sender") can transmit a document to be signed ("a signature document") to a mobile device of a second user (a "signer"). Then, using a browser or other client module executing on the mobile device, the signer can import the document into the ESS. Once the document is imported into the ESS, the signer can access, review, and sign the document via the mobile device. After signing the document, the signer can use the mobile device to cause the ESS to provide the signed document to one or more recipients.

Some embodiments use a hybrid approach that leverages not only local software on a mobile device, but also use Internet cloud services that provide a consistent experience across all types of devices and platforms. In some implementations, minimal processing takes place locally on the mobile device, while the majority of the work performed (e.g., securing the document, converting the files, managing the signing, and returning the file via email directly through the web, or via fax) is handled on a Web service application or in a browser on the mobile device, and is not reliant upon the local device/platform facilities (or lack thereof). Thus, such embodiments may provide access to electronic signature services to devices and platforms that do not include specific security or document conversion or manipulation (e.g., PDF conversion and manipulation) software.

Figure 1:
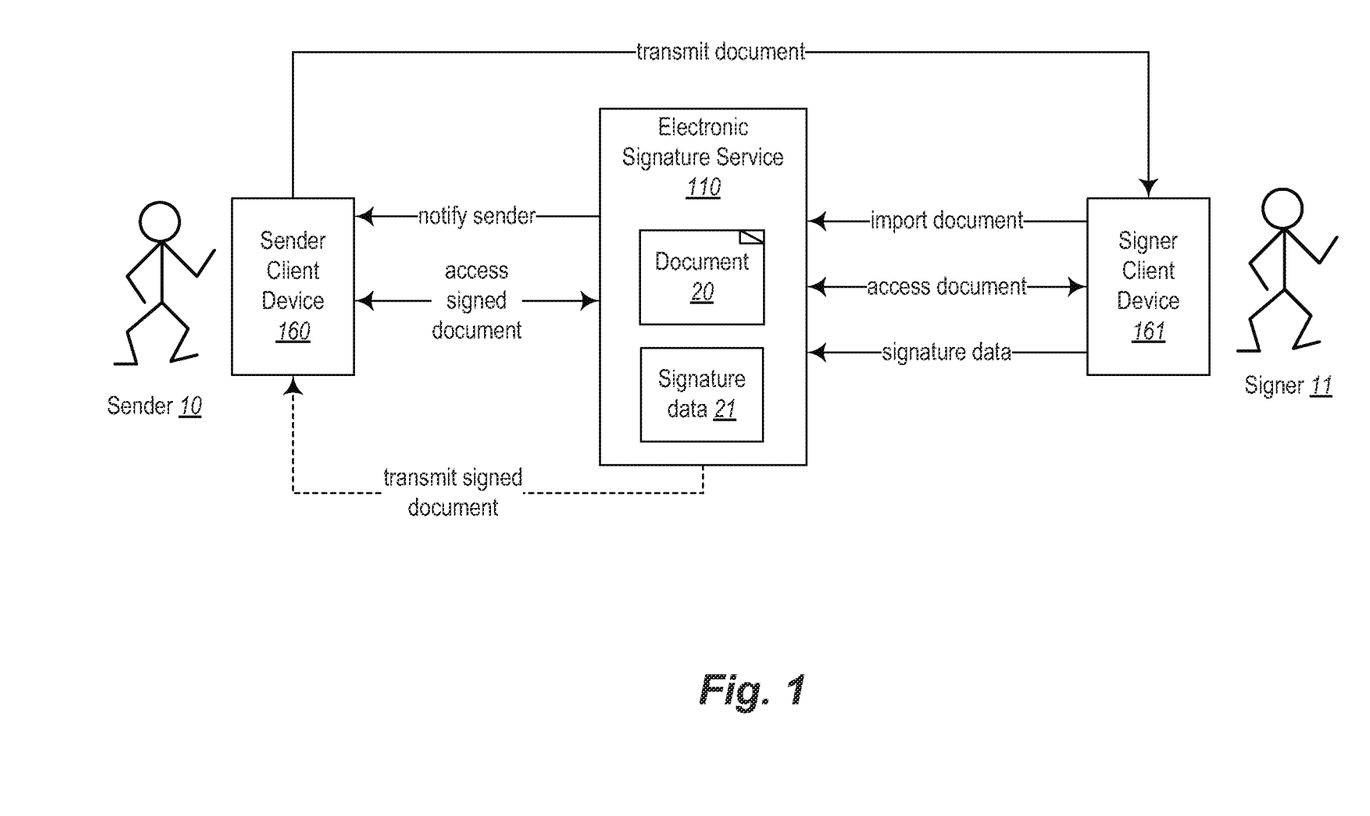
FIG. 1 illustrates a block diagram of an example embodiment of an electronic signature service.

FIG. 1 illustrates an example block diagram of an example embodiment of an electronic signature service. In particular, FIG. 1 depicts an electronic signature service 110 utilized by a sender user 10 and a signer user 11 to facilitate an electronic signing of a signature document.

In the illustrated scenario, the sender 10 operates a sender client device 160 in order to transmit an electronic document (e.g., a contract or agreement) to a signer client device 161 operated by the signer 11. For example, the sender 10 may send an email with a signature document included as an attachment to the email. The transmitted document may be in any format, such as PDF, Microsoft Word, HTML, text, or the like. Typically, the signer client device 161 is a mobile device, such as a smart phone, tablet computer, personal digital assistant, or the like. However, the techniques may be equally applied in other contexts and/or to other types of computing devices, including desktop computers, kiosk systems, and the like. In particular, some embodiments provide a module (e.g., plug-in, widget, extension) configured to perform some of the described techniques in the context of a desktop email client (e.g., Outlook), a hosted email service (e.g., Google Mail, Yahoo! Mail, Hotmail), or other application. In addition, the techniques may generally be deployed (e.g., as a signature module) in the context of any Web-based information or e-commerce service that has a need to obtain an electronic signature from a user (e.g., to obtain assent to terms and conditions, to enter into purchase/sale agreements, etc.).

The signer 11 can then use client logic executing on the signer client device 161 to import the document into the ESS 110. For example, when the signer 11 uses an email client (on a mobile or other type of client device) to read an email that includes the signature document, the signer 11 can select a user interface control (e.g., button, menu option, widget) of the email client to initiate an import of the signature document into the ESS 110. The document is then transmitted from the signer client device 161 to the ESS 110, where it is possibly converted and stored as document 20. Converting the document may include converting the document into a standard or preferred format for storage within the ESS 110. For example, if the original document was in Microsoft Word or HTML format, it may be converted into PDF by the ESS 110.

Once the document is imported into the ESS 110 and securely stored as document 20, the signer 11 can use the client device 161 to interact with the ESS 110 and perform various electronic signature-related operations. For example, the signer 11 can access and review the document by presenting and browsing the document using a browser or other client logic executing on the client device 161. As another example, the signer 11 can input data (e.g., telephone number, address) into form fields or other input elements of the signature document 20. Once the signer 11 has reviewed and/or modified the document to his satisfaction, he can provide signature data which is then securely stored by the ESS 110 as signature data 21 in association with the document 20.

Once the signer 11 has signed the document 20, the signer 11 can cause the ESS to provide the signed document 20 a recipient. For example, the signer 11 may return the signed document to the sender 10 or some other recipient. Different approaches to providing signed documents are contemplated. In the illustrated embodiment, the signer 11 can cause the ESS 110 to notify the sender 10, such as by causing the ESS 110 to transmit (e.g., in an email) a URL, link, or other identifier of the document 20 to the sender client device 160. The sender 10 can then use a browser or other client logic executing on the sender client device 160 to access the signed document on the ESS 110. Such an approach may be advantageous for sensitive documents which may preferably not be transmitted within an email or via some other possibly insecure transmission facility. In other embodiments, the ESS 110 can transmit the signed document 20 via an email, fax, or other transmission mechanism.

The ESS 110 may provide other or additional functions. For example, the ESS 110 may provide or facilitate intelligent form-filling operations. In one embodiment, when the signer 11 repeatedly uses the ESS 110 to electronically sign documents, the ESS 110 tracks form data (e.g., names, addresses, telephone numbers) provided by the signer 11, such that forms within signature documents can be automatically populated with data elements, thereby increasing the efficiency of the signature process.

In some embodiments, all or most of the above functions can be performed with a lightweight client (e.g., a Web browser) executing on the client device 161, such that no or minimal special purpose software need be installed on the client device 161 to perform or access the full spectrum of signature services provided by the ESS 110. In this manner, described techniques overcome many of the limitations of known approaches to facilitating electronic signatures on mobile devices. For example, in a known approach, a client must install a special purpose signature application (a "signature app") on a mobile phone to attach electronic signatures to documents. Unfortunately, this application is distinct from the email client on the mobile phone, such that the user must manually move a received document into the signature app, attach a signature, move the signed document back to the email client, and then transmit the signed document to a recipient. Such processing is inefficient, cumbersome, and not user-friendly. Moreover, many signature apps do not include features such as document conversion, so they are unable to attach signatures to various common document formats. Furthermore, the diversity of mobile phone platforms (e.g., iPhone, Android, Blackberry) means developing and supporting distinct applications for each platform. The described techniques, on the other hand, are largely platform independent, as the core functionality is provided by the ESS 110, but accessed from diverse clients using standard Web browsers.

Figure 2A:
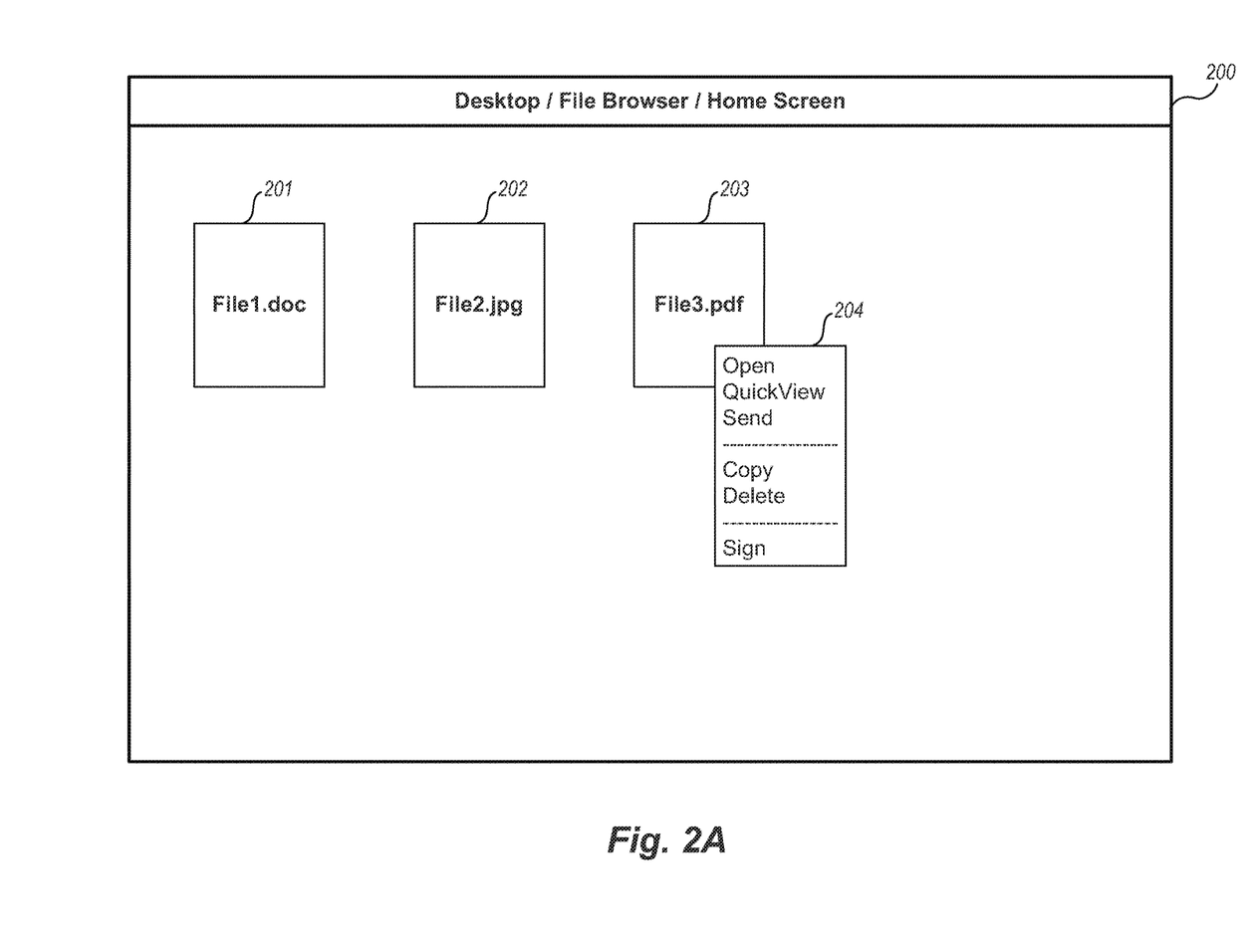
FIGS. 2A-2D illustrate user interface screens according to example embodiments.

FIGS. 2A-2D illustrate user interface screens according to example embodiments. FIG. 2A illustrates a home screen 200 presented by a client device. The screen 200 may be provided by a mobile client device, such as a smart phone or tablet computer. In other embodiments, the screen 200 may be part of a file chooser/browser or desktop computing system. The screen 200 displays files and other data items managed by or stored on the client device. In the illustrated example, the screen 200 includes icons 201-203, respectively representing a first, second, and third file/document. The first document is a text document (e.g., a Microsoft Word file). The document is an image file (e.g., a JPG file). The third document is a PDF file.

The screen 200 also includes a menu control 204. The menu control 204 is displayed in response to a user selection (e.g., tap, touch, mouse click) of icon 203. The menu control 204 presents commands or functions that may be performed with respect to the document represented by icon 203. One of the options is "Sign." When the Sign option is selected by the user, the illustrated embodiment will initiate a signature process as described herein, including by importing the document (of file3.pdf) into the ESS 110 and allowing the user to review and sign the document. An example screen configured to facilitate signature of the document is described with respect to FIG. 2C, below.

Figure 2B:
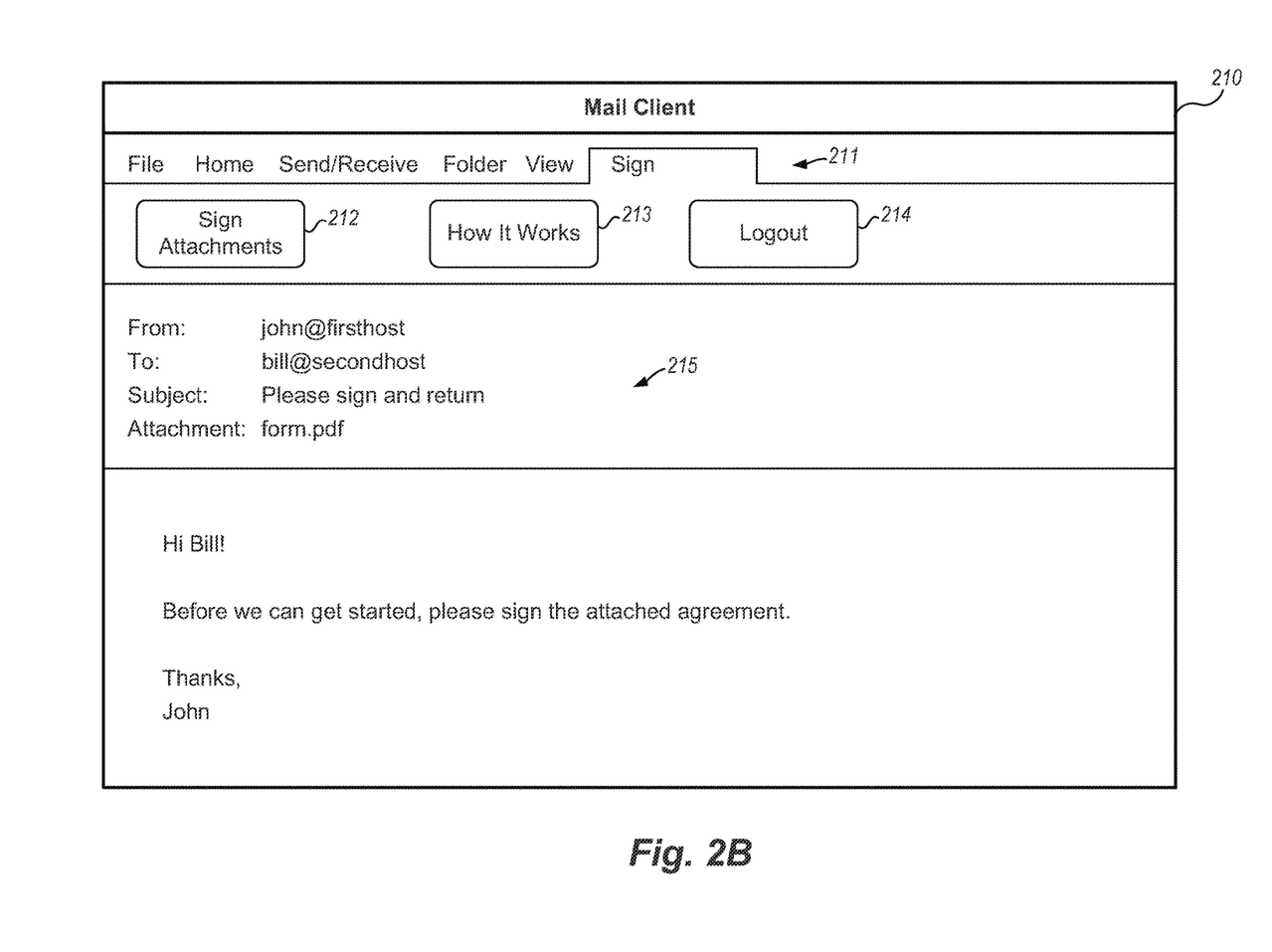

FIG. 2B illustrates a message screen 210 provided by an email client. The message screen 210 is configured to present a received email message 215 and provide access to various email functions, grouped into a tab menu 211. The tab menu 211 includes various function tabs, including a Sign tab that provides controls for electronically signing an attachment to the displayed email message 215.

In the illustrated example, the email message 215 includes an attachment (form.pdf) that is to be signed by the recipient of the message. To sign the attachment, the recipient user first selects the Sign tab. The Sign tab includes buttons 212-214. Button 212, when selected by the user, causes the attachment to be imported into the ESS 110 and invokes a signature process. Button 213 provides help documentation for new and returning users. Button 214 is configured to log the user out of the ESS 110.

The signature-related functionality described with respect to FIGS. 2A and 2B may be provided in various ways. In one embodiment, a plug-in or other code module is installed or otherwise added to the operating system, file manager, mail client, Web browser, or other software of the client device. Upon installation, a respective user interface (e.g., menu control 204, tab menu 211) is modified to include controls (e.g., the Sign option of menu control 204, the Sign tab or button 212 of tab menu 211) that are configured to invoke signature functions as described herein.

Figure 2C:
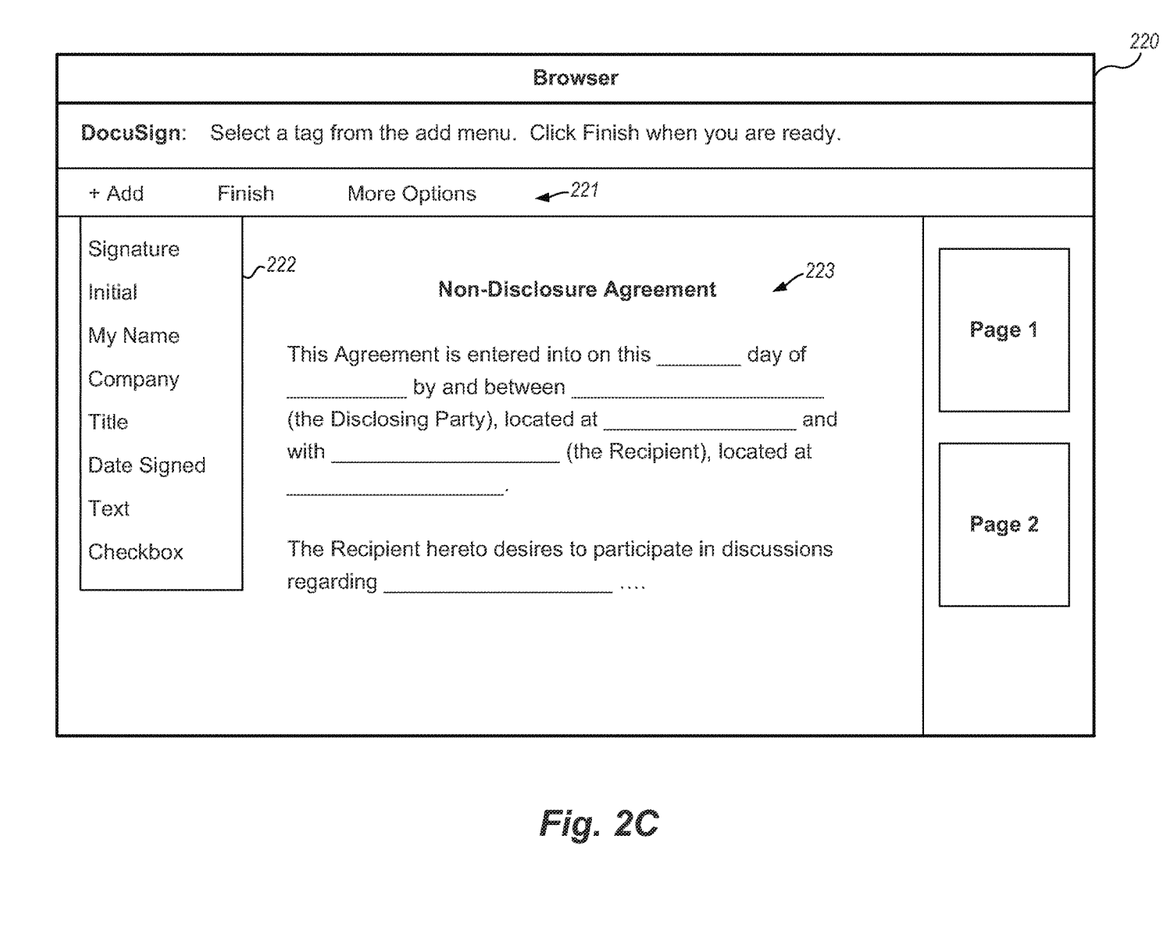

FIG. 2C illustrates a signature screen 220 provided by a Web browser. The signature screen 220 is presented in response to an indication that a user desires to sign a document. For example, the screen 220 may be presented automatically in response to a user selection of the Sign option of menu control 204 (FIG. 2A) or the Sign button 212 (FIG. 2B). The signature screen 220 is presented within a Web browser and provides access to functionality of the ESS 110 for signing an electronic signature document. By performing signatures via a Web browser interface, no special electronic signature software need be installed on the user's client device.

The signature screen 220 displays a signature document 223 and includes a menu bar 221. The signature document 223 may be a copy or other representation of an attachment or other document imported by the user, as discussed above. The menu bar 221 includes an Add control, a Finish control, and a More Options control. The Add control, when selected, displays a menu 222 of signature elements. The signature elements include a signature, signer initials, signer name, signer company, signer title, date signed, text, and checkbox. By selecting one of the signature elements, the user/signer can insert (e.g., drag and drop) the corresponding element into the signature document 223. For example, by selecting the "Signature" signature element, the user can insert or associate his signature into the document 223. By selecting the "My Name" signature element, the user can insert his printed name into the document 223.

When the user has reviewed and signed the document 223, the user selects the Finish control of the menu 221. The Finish control causes the now modified document 223 to be securely stored by the ESS 110. The Finish control may also provide options or otherwise access functions for providing the signed document 223 to one or more recipients. For example, the Finish control may automatically invoke an email client on the signer's client device, as described next with respect to FIG. 2D.

Figure 2D:
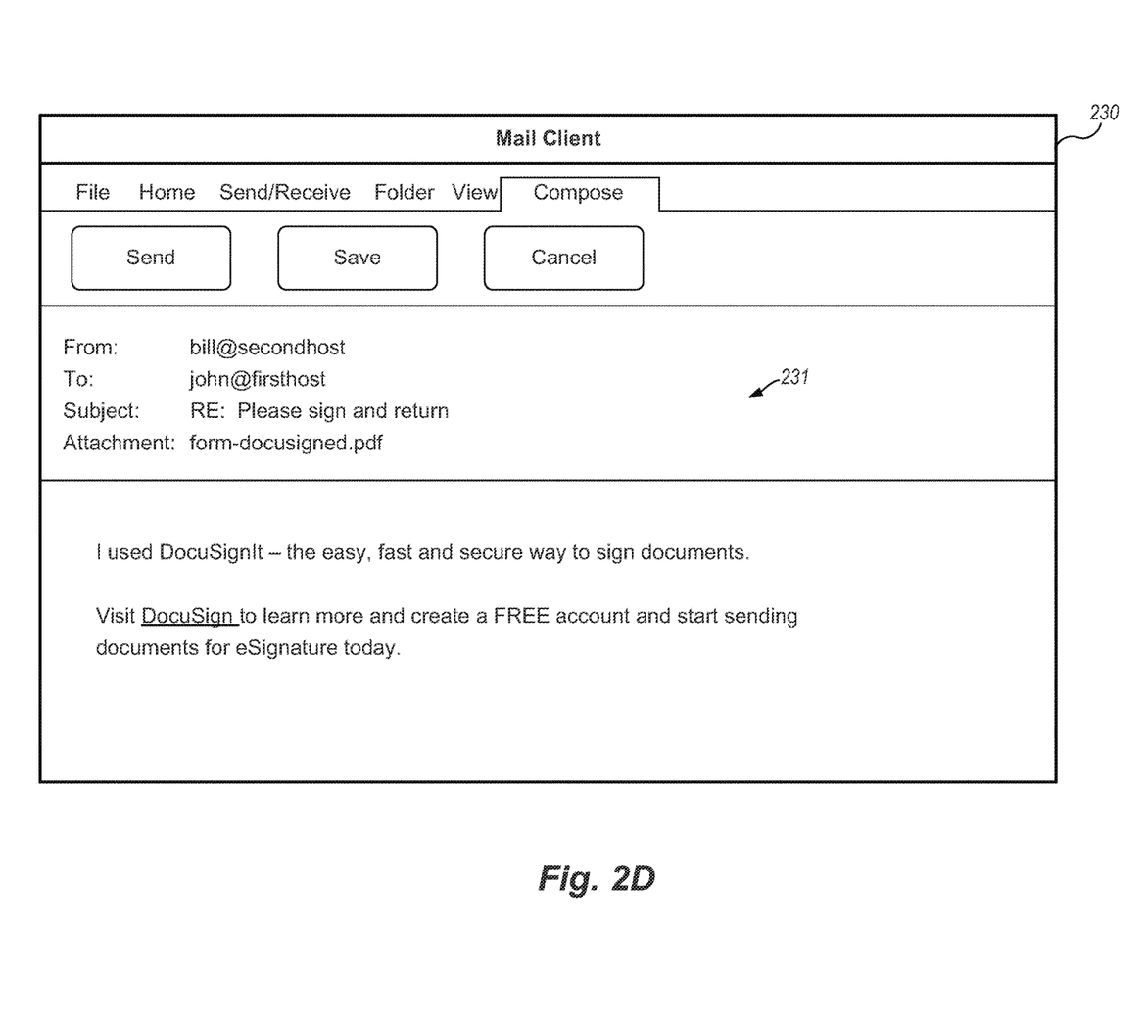

FIG. 2D illustrates a message composition screen 230 provided by an email client. The email client may in some embodiments be automatically invoked upon the conclusion of the signature process described with respect to FIG. 2C, above. The message composition screen 230 includes an automatically generated email message 231. The message 231 includes header fields (e.g., to, from, subject) that may be automatically populated, based on information about the user's past actions or context. For example, if the user invoked the signature process from within the message screen 210 of FIG. 2B, the email address of the sender of the message 215 (john@firsthost) may be automatically transmitted to the ESS (along with the attachment to be signed). After signature, the email address of the original sender may be provided back to the email client for inclusion as the recipient of the message 231. A similar technique may be used to automatically populate other fields, such as the subject line of the message 231. The message 231 also includes marketing text ("I used DocuSignIt . . . Visit DocuSign . . . ") that describes the ESS 110 and encourages the message recipient to access and/or sign up for an account with the ESS 110.

In other embodiments, the message 231 does not include the signed document as an attachment. Rather, the message 231 may include a link or other identifier that can be used by the recipient to access the signed document at the ESS 110 or some other location.

Figure 3:
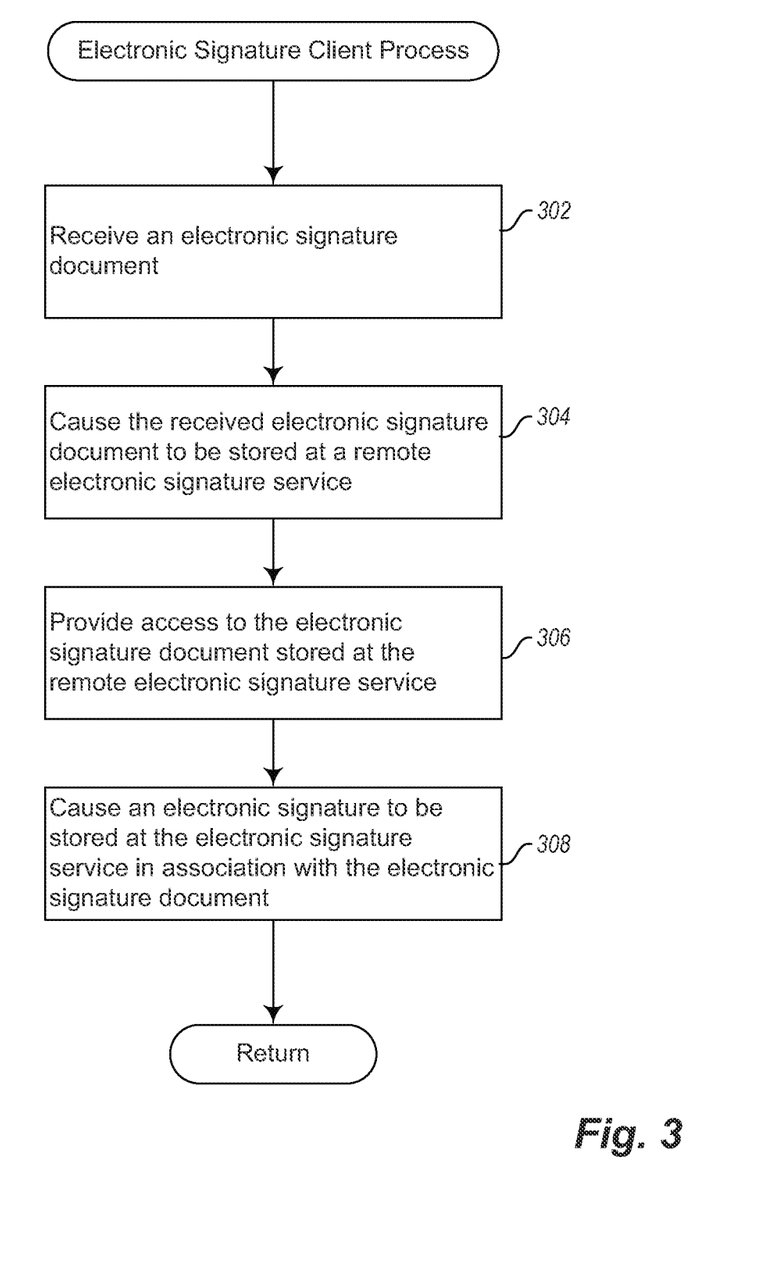
FIG. 3 is a flow diagram of an example electronic signature client process.

FIG. 3 is a flow diagram of an example electronic signature client process. The illustrated process may be performed by, for example, logic executing on the signer client device 161.

The process begins at block 302, where it receives an electronic signature document. As noted, the client device 161 may receive the document in various ways, such as by receiving an email, downloading a file (e.g., from a Web site), or the like.

At block 304, the process causes the received electronic signature document to be stored at a remote electronic signature service. The client device 161 may include logic that uploads, imports, or otherwise transmits the document to the electronic signature service in response to a user input. For example, an email client may include a plug-in or other module with which the user of the client device 161 can import the document to the electronic signature service for storage, review, signature, and/or distribution.

At block 306, the process provides access to the electronic signature document stored at the remote electronic signature service. Providing access may include automatically launching or invoking a Web browser or other client module that can be used to access, review, and sign the document at the remote electronic signature service. Using the Web browser or other client module, the user may review, modify, and sign the document.

At block 308, the process causes an electronic signature to be stored at the electronic signature service in association with the electronic signature document. Typically, the client module (e.g., Web browser) invoked at block 306, above will be operated by the user to then sign the document. Once the user signs the document, the electronic signature service will securely store the signature in association with the document.

Figure 4:
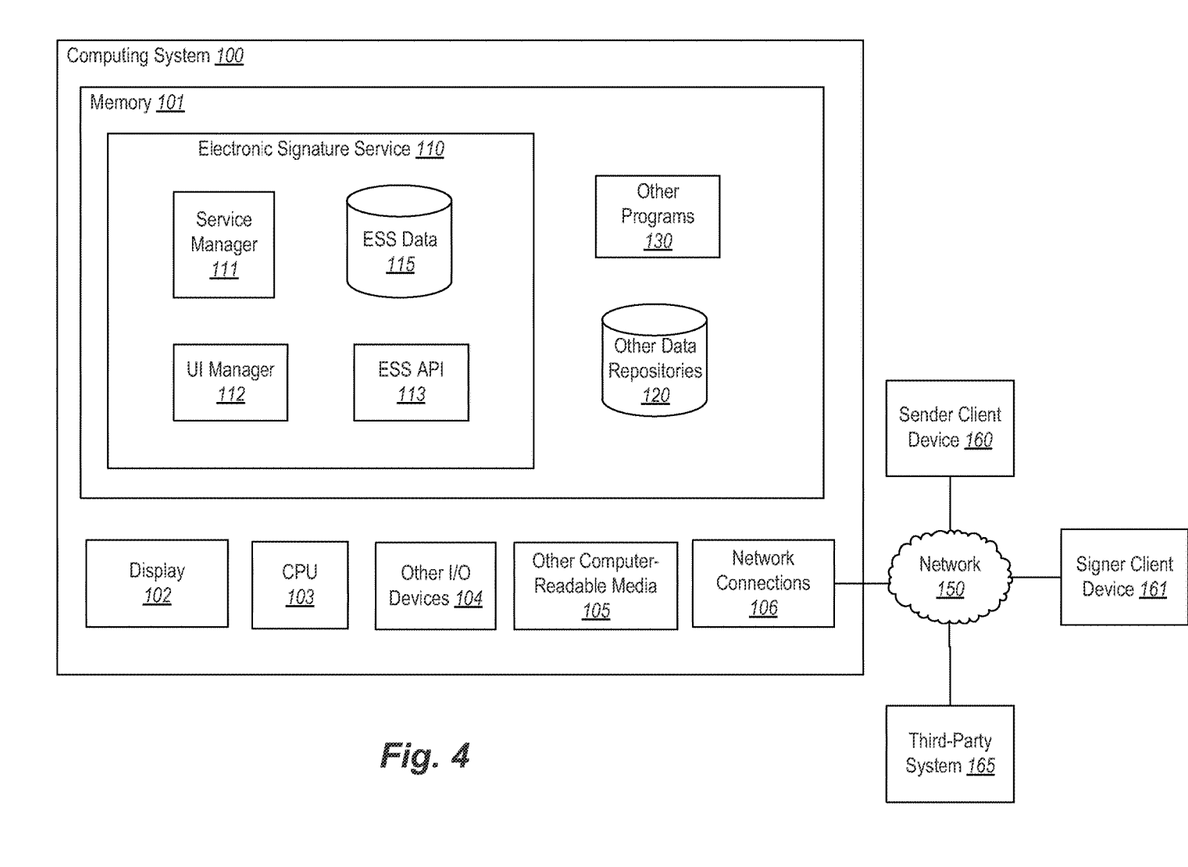
FIG. 4 is a block diagram of a computing system for implementing an electronic signature service according to an example embodiment.

FIG. 4 is a block diagram of an example computing system for implementing an electronic signature service according to an example embodiment. In particular, FIG. 4 shows a computing system 100 that may be utilized to implement an electronic signature service 110. Note that the techniques described for implementing the electronic signature service 110 may similarly be applied to implementing client logic (e.g., a plug-in) for importing and initiating electronic signature processes on a client device.

Note that one or more general purpose or special purpose computing systems/devices may be used to implement the electronic signature service 110. In addition, the computing system 100 may comprise one or more distinct computing systems/devices and may span distributed locations. Furthermore, each block shown may represent one or more such blocks as appropriate to a specific embodiment or may be combined with other blocks. Also, the electronic signature service 110 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The electronic signature service 110 is shown residing in memory 101. In other embodiments, some portion of the contents, some or all of the components of the electronic signature service 110 may be stored on and/or transmitted over the other computer-readable media 105. The components of the electronic signature service 110 preferably execute on one or more CPUs 103 and facilitate mobile electronic signature processes described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 4 may not be present in any specific implementation. For example, some embodiments may not provide other computer readable media 105 or a display 102.

The electronic signature service 110 includes a service manager 111, a user interface ("UI") manager 112, an electronic signature service application program interface ("API") 113, and an electronic signature service data store 115.

The ESS 110, via the service manager 111 and related logic, generally performs electronic signature-related functions for or on behalf of users operating a sender client device 160 and/or a signer client device 161. In one embodiment, a signer operating signer client device 161 imports (e.g., transmits, uploads, sends) a document to be electronically signed into the ESS 110. The ESS stores the document securely in data store 115. Secure document storage may include using cryptographic techniques to detect document tampering, such as generating hashes, message digests, or the like. The signer operating the signer client device 161 then accesses, reviews, and signs the document stored by the ESS 110. In some embodiments, the ESS 110 transmits images or some other representation of the document to the signer client device 161, which in turn transmits an indication of the signer's signature (or intent to sign) to the ESS 110. The ESS 110 then securely stores the signer's signature in association with the document in the data store 115. After signing the document, the signer using signer client device 161 can cause the ESS 110 to provide the signed document to one or more recipients, such as via email, fax, or other mechanism.

The service manager 111 may perform other or additional functions, such as intelligent form filling as discussed above. Also, the service manager 111 may provide code modules that can be installed on the signer client device 161 and that are configured to integrate the signer client device 161 with the ESS 110. For example, a code module may be installed on the signer client device 161 and extend the functionality of an email client by adding a control (e.g., button, menu item, widget) that is configured to import, in response to selection or activation by a user, a received documents into the ESS 110.

The UI manager 112 provides a view and a controller that facilitate user interaction with the electronic signature service 110 and its various components. For example, the UI manager 112 may provide interactive access to the electronic signature service 110, such that users can upload or download documents for signature, review and modify documents, transmit or otherwise provide signed documents to recipients, and the like. In some embodiments, access to the functionality of the UI manager 112 may be provided via a Web server, possibly executing as one of the other programs 130. In such embodiments, a user operating a Web browser (or other client) executing on one of the client devices 160 or 161 can interact with the electronic signature service 110 via the UI manager 112.

The API 113 provides programmatic access to one or more functions of the electronic signature service 110. For example, the API 113 may provide a programmatic interface to one or more functions of the electronic signature service 110 that may be invoked by one of the other programs 130 or some other module. In this manner, the API 113 facilitates the development of third-party software, such as user interfaces, plug-ins, news feeds, adapters (e.g., for integrating functions of the electronic signature service 110 into Web applications), and the like. In addition, the API 113 may be in at least some embodiments invoked or otherwise accessed via remote entities, such as the third-party system 165, to access various functions of the electronic signature service 110. For example, a hosted email service executing on the system 165 may provide access to the electronic signature functionality of the ESS 110 via the API 113. As another example, an e-commerce site (e.g., online store) executing on the system 165 may provide access to the electronic signature functionality of the ESS 110 via the API 113, such as by providing a signature control/widget configured, when selected by a user, to initiate an electronic signature process as described herein.

The data store 115 is used by the other modules of the electronic signature service 110 to store and/or communicate information. The components of the ESS 110 use the data store 115 to record various types of information, including documents, signatures, tracked form entries, and the like. Although the components of the ESS 110 are described as communicating primarily through the data store 115, other communication mechanisms are contemplated, including message passing, function calls, pipes, sockets, shared memory, and the like.

The electronic signature service 110 interacts via the network 150 with client devices 160 and 161, and third-party systems 165. The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160 and 161 include personal computers, laptop computers, smart phones, personal digital assistants, tablet computers, and the like.

In an example embodiment, components/modules of the electronic signature service 110 are implemented using standard programming techniques. For example, the electronic signature service 110 may be implemented as a "native" executable running on the CPU 103, along with one or more static or dynamic libraries. In other embodiments, the electronic signature service 110 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the electronic signature service 110, such as in the data store 118, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 118 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the ESS 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

All of the above-cited references, including Appendixes A and B, are incorporated herein by reference in their entirety. Where a definition or use of a term in an incorporated reference is inconsistent or contrary to the definition of that term provided herein, the definition of that term provided herein governs and the definition of that term in the reference does not apply.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:

receiving, by a client computing device associated with a signer from a client computing device associated with a sender, an electronic signature document, wherein the electronic signature document is received from the client computing device of the sender by the client computing device of the signer independently of an electronic signature service;

installing a code module on the signer's client computing device, the code module received from the electronic signature service and configured to transmit the electronic signature document received by an email client of the signer's client computing device to the electronic signature service;

in response to a first input received from the signer, transmitting, by the signer's client computing device, the received electronic signature document to the electronic signature service for storage in the electronic signature service;

accessing, by the signer's client computing device, the electronic signature document stored in the electronic signature service, wherein accessing the electronic signature document includes signing the stored electronic signature document in response to a second input from the signer; and causing, by the signer's client computing device, the electronic signature service to transmit an email attached with a copy of the stored electronic signature document to the client computing device of the sender using the code module.

2. The method of claim 1, further comprising causing, by the signer's client computing device, the electronic signature service to transmit a copy of the stored electronic signature document to the sender as a fax.

3. The method of claim 1, wherein the email includes an identifier associated with the stored electronic signature document for allowing access to the stored electronic signature document in the electronic signature service by the sender.

4. The method of claim 1, further comprising using a Web browser executing on the signer's client computing device to access the electronic signature document stored in the remote electronic signature service and adapted to cause the electronic signature of the signer to be stored in association with the electronic signature document.

5. The method of claim 1, further comprising automatically populating, by the signer's client computing device, form fields in the electronic signature document based on prior form entries made by the signer.

6. A non-transitory computer-readable medium storing instructions that, when executed by a client computing device associated with a signer, cause the client computing device to perform operations comprising:

receiving, by the signer's client computing device from a client computing device of a sender, an electronic signature document, wherein the electronic signature document is received from the client computing device of the sender by the client computing device of the signer independently of an electronic signature service;

installing a code module on the signer's client computing device, the code module received from the electronic signature service and configured to transmit the electronic signature document received by an email client of the signer's client computing device to the electronic signature service;

in response to a first input received from the signer, transmitting, by the signer's client computing device, the received electronic signature to the electronic signature service for storage in the electronic signature service;

accessing, by the signer's client computing device, the electronic signature document stored in the electronic signature service; wherein accessing the electronic signature document includes signing the stored electronic signature document in response to a second input from the signer; and causing, by the signer's client computing device, the electronic signature service to transmit an email attached with a copy of the stored electronic signature document to the client computing device of the sender.

7. A client computing device associated with a signer, the client computing device comprising:

a processor; and memory coupled to the processor and storing instructions that, when executed by the processor, cause the signer's client computing device to perform operations comprising:

receiving an electronic signature document from a client computing device associated with a sender, wherein the electronic signature document is received from the client computing device of the sender by the client computing device of the signer independently of an electronic signature service;

installing a code module on the signer's client computing device, the code module received from the electronic signature service and configured to transmit the electronic signature document received by an email client of the signer's client computing device to the electronic signature service in response to a first input received from the signer, transmitting, by the signer's client computing device, the received electronic signature document to the electronic signature service for storage in the electronic signature service;

accessing, by the singer's client computing device, the electronic signature document stored in the electronic signature service, wherein accessing the electronic signature document includes signing the stored electronic signature document in response to a second input from the signer; and causing, by the signer's client computing device, the electronic signature service to transmit an email attached with a copy of the stored electronic signature document to the client computing device of the sender using the code module.

8. The client computing device associated with the signer of claim 7, wherein the signer's client computing device accesses the electronic signature document via a Web browser executing on the signer's client computing device.

9. The client computing device associated with the signer of claim 7, wherein the signer's client computing device is a smart phone or a tablet computer.

10. The client computing device associated with the signer of claim 7, wherein the signer's client computing device does not include PDF conversion or manipulation software.

11. The client computing device associated with the signer of claim 7, wherein the email message further includes a link for accessing the electronic signature document stored in the electronic signature service.

12. The computer-readable medium of claim 6, wherein the medium further stores instructions for causing, by the signer's client computing device, the electronic signature service to transmit a copy of the stored electronic signature document to the sender as a fax.

13. The computer-readable medium of claim 6, wherein the email includes an identifier associated with the stored electronic signature document for allowing access to the stored electronic signature document in the electronic signature service by the sender.

* * * * *